Aug. 12, 1930.  C. J. LANE  1,772,669
SPINACH WASHER AND BLANCHER
Filed Aug. 10, 1927  2 Sheets-Sheet 1
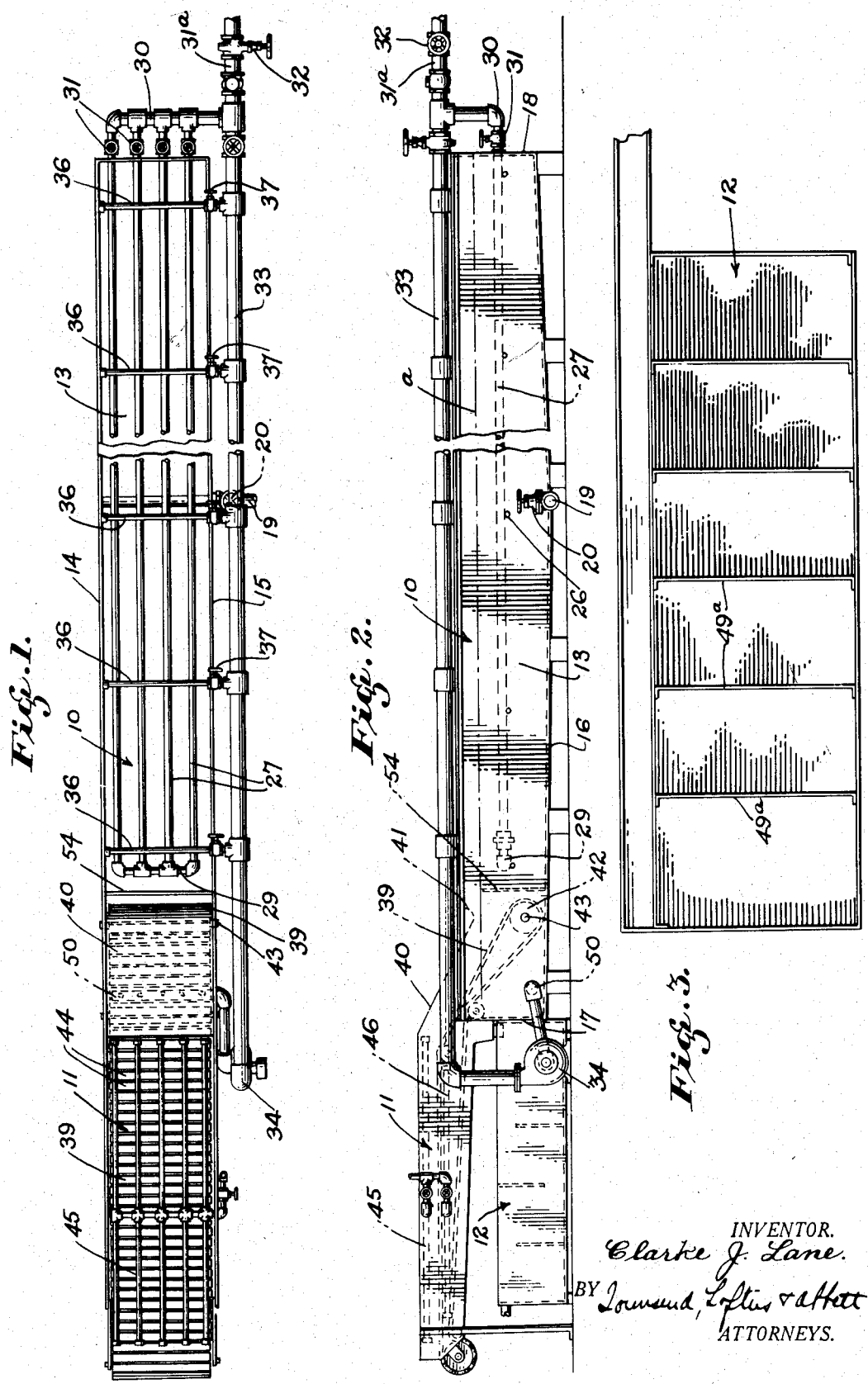
INVENTOR.
Clarke J. Lane.
BY Townsend, Loftus & Hett
ATTORNEYS.

Aug. 12, 1930.  C. J. LANE  1,772,669
SPINACH WASHER AND BLANCHER
Filed Aug. 10, 1927    2 Sheets-Sheet 2

INVENTOR.
Clarke J. Lane.
BY Townsend Loftus & Attell
ATTORNEYS.

Patented Aug. 12, 1930

1,772,669

UNITED STATES PATENT OFFICE

CLARKE J. LANE, OF SACRAMENTO, CALIFORNIA

SPINACH WASHER AND BLANCHER

Continuation of application Serial No. 170,084, filed February 23, 1927. This application filed August 10, 1927. Serial No. 211,957.

This invention relates to a method and means of treating fruits and vegetables, and particularly pertains to a spinach washing and blanching machine and is a continuation of my application "Spinach washer and blancher", filed February 23, 1927, Serial No. 170,084.

In the preparation of fruits and vegetables for the market and in certain instances preparatory to canning, it is necessary to thoroughly wash fruit or vegetables and in some instances to blanch them, and it is the principal object of the present invention to provide means whereby fruit and vegetables may be readily and thoroughly washed by mechanical means and whereby the articles may thereafter be properly blanched and rendered ready for further operations.

The present invention contemplates the use of a washing tank along and within which fruit or vegetables may be advanced in a turbulent washing bath, said tank being fitted at one end with means for elevating the articles from the bath and delivering them to suitable drying and packing means or to a blanching device by which the articles are blanched by the action of steam.

The invention is illustrated by way of example in the accompanying drawings, in which—

Figure 1 is a view in plan illustrating the complete apparatus with which the present invention is concerned.

Figure 2 is a view in side elevation showing the washing and blanching apparatus.

Figure 3 is an enlarged view in plan showing the settling tank.

Figure 4:
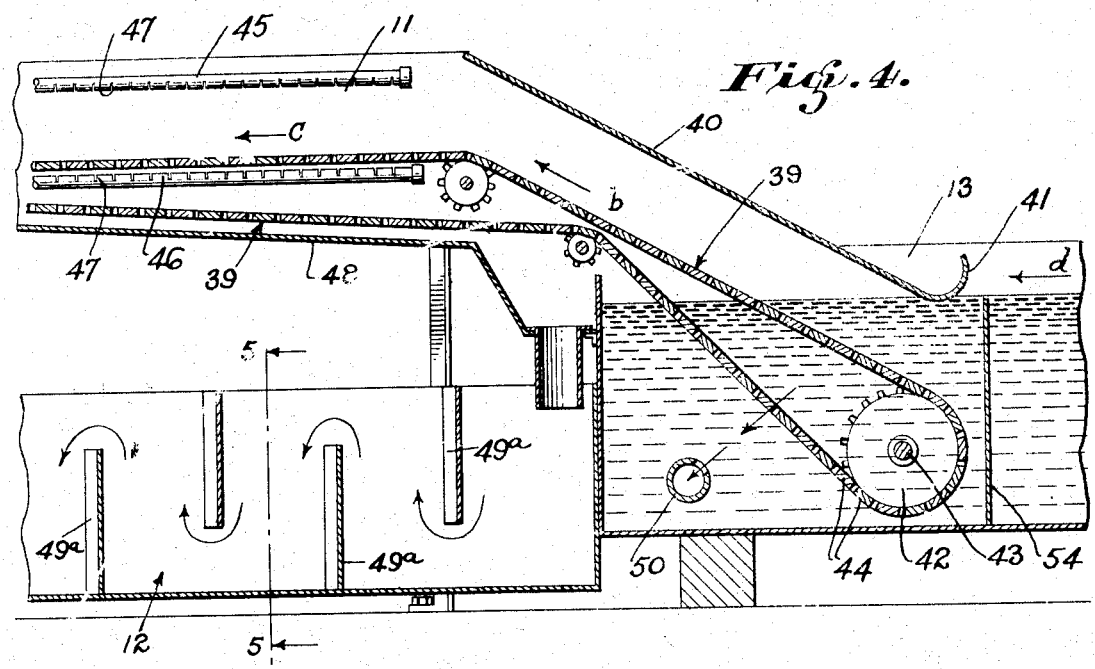
Figure 4 is an enlarged fragmentary view in vertical section showing one end of the washing tank, the elevating means leading to the blanching apparatus, and a portion of the settling tank disposed therebeneath.
Figure 5:
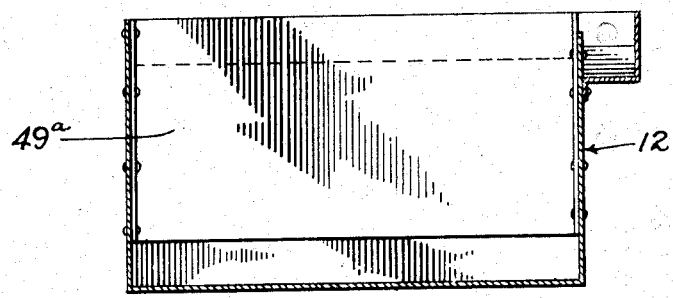
Figure 5 is a view in vertical section through the settling tank as seen on the line 5—5 of Figure 4.

Referring more particularly to Figures 1 and 2 of the drawings, it will be seen that the present apparatus consists of a washing apparatus 10, a blanching apparatus 11, and a settling tank structure 12. The washing apparatus comprises a horizontally disposed tank 13, which may be of any desired length, dependent upon the necessary washing operation. This tank is formed with opposite vertical sides 14 and 15 and a bottom 16. The bottom inclines from the opposite ends 17 and 18 toward the longitudinal center of the tank where a drain pipe 19 is in communication with the tank and will permit the material in the tank to be drained therefrom as controlled by valve 20.

Figure 6:
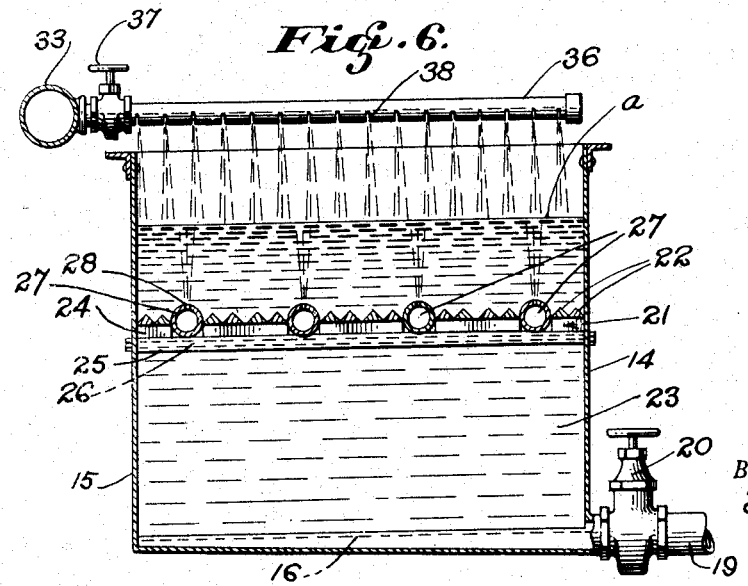
Figure 6 is an enlarged view in vertical section through the washing tank as seen on the line 6—6 of Figure 2.

As shown in Figure 6 of the drawing, the tank is formed with a false bottom 21, which comprises parallel longitudinally extending slats 22. These slats are of triangular cross section and form intervening troughs through which the dirt and silt, which has been washed from the articles, may pass to the compartment 23 beneath the false flooring. This insures that a large amount of foreign matter will be removed from the turbulent area in the tank, and that the articles will be washed in water which is relatively clean. The longitudinal slats 22 are mounted upon supports 24 carried by laterally extending pipes 25 through which stay bolts 26 extend. These lateral members also support a plurality of parallel longitudinally extending agitating pipes 27. These pipes extend substantially the length of the tank and are formed throughout the upper surface of their lengths with openings 28, through which a jet of liquid may be projected vertically and in an upward direction. Due to the fact, as will hereinafter be described, that the pipes 27 are at all times submerged, it will be understood that the jets will create ebullition of the liquid and insure that the entire body of liquid above the false floor 21 will be in a constant state of turbulence.

The pipes 27 are united by a lateral header 29 at one end, and are united at the opposite end to a distributing manifold 30. Valves 31 control the flow of liquid from the manifold 30 to the individual pipes. The manifold 30 communicates with a feed pipe 31ᵃ, by which fresh water may be supplied as controlled by valve 32. This manifold also connects with a return circulating pipe 33 leading to a pump 34 and by which liquid is drawn from the washing tank 13 and is delivered then to the agitating pipes 27 for further use.

As shown in Figures 2 and 6 of the drawings, the volume of water within the washing tank 13 will assume substantially the level indicated at "a". This level is sufficiently above the agitating pipes 27 as to insure that the articles being washed will float upon the water and may travel lengthwise of the tank in the direction of the arrow "d" as the tank is drained by pump 34.

Disposed at intervals throughout the length of washing tank 13 and in spaced parallel relation to each other laterally of the tank, are pipes 36, which communicate with the distributing return pipe 33, and which are individually controlled by valves 37. These pipes, as shown in Figure 6 of the drawing, are formed with openings 38 in their under faces and at spaced intervals throughout the length of the pipe. Jets of water are thus projected downwardly against the surface of the washing bath with sufficient force to cause the articles travelling lengthwise of the tank and floating in the bath to be submerged and turned over at intervals so that they will not only be subjected to the turbulence of the bath in the washing operation, but will be forced downwardly into the liquid and violently "churned" to loosen the dirt and to thoroughly clean them. This is of particular advantage in connection with the treatment of spinach in which small particles of dirt and other extraneous matter adheres to the leaves. Disposed at the discharge end of the washing tank is an endless conveyor 39, which acts as an elevator for the articles floating in the washing bath and causes the articles to be lifted from the bath.

The baffle member 40 is disposed above the elevator and has an upturned end 41 occurring at substantially the level of the liquid in the bath so that the articles being washed will be held back and will advance to the conveyor in a substantially uniform volume. For example, in the treatment of spinach, this acts to cause the spinach to be arranged in approximately two layers and to thus be carried up on the conveyor and through the blanching apparatus 11, thereby insuring that the steam will have thorough access to all the particles of the spinach and will perform a thorough blanching action. It is one of the particular advantages of the present invention that the conveying apparatus here disclosed uniformly distributes the material being washed and subjects it to the blanching action in continuous and uniform quantities so that the blanching action will be thoroughly accomplished.

The conveying mechanism may be of any desired construction, although it is here shown as comprising sprockets 42 carried upon a transverse shaft 43 submerged within the bath of the washing tank 13, and which sprockets carry lateral slats 44 upon which the articles may be deposited and by which they will be elevated into the blanching apparatus. The upper run of the conveyor includes an inclined section of travel (indicated by the arrow "b" in Figure 4) and a horizontal section of travel, as indicated by the arrow "c" in the same figure. The angle of inclination of the portion "b" in such as to insure that the articles floating on the surface of the bath will frictionally engage the conveyor and will remain in frictional contact therewith as the articles are elevated. The section "c" is of sufficient length to insure that the articles will be properly blanched during their horizontal path of travel by the steam pipes 45 and 46 disposed above and below the upper horizontal run of the conveyor. These pipes are formed with perforations 47 in their disposing faces, which perforations permit jets of steam to project vertically against and through the opposite sides of the upper horizontal run of the conveyor 39. These jets of steam will perform a thorough and uniform blanching action and will operate more successfully in a great many instances than would be the case if the articles were submerged in boiling water.

The condensed liquid draining from the articles while passing through the blanching apparatus will be caught in a drain pan 48 and will flow into the launder 35, thereafter passing to the pump 34. The settling tank is formed with a plurality of staggered baffle plates 49$^a$, which are alternately arranged to insure that the drain liquid flowing into the settling tank at the end adjacent the washing tank 12 will thereafter pursue a sinuous path of travel in a vertical plane over and under the alternate baffle plates 49$^a$ until the end of the tank is reached. During this sinuous flow of the liquid, the suspended matter therein will settle out of the liquid and will insure that the previously used washing liquid will be of a turbidity which is satisfactory to permit the liquid to again be used in washing incoming material.

In the operation of the present invention, the articles to be washed, as for example, spinach leaves, are dumped into the end of the washing tank 13 adjacent the end wall 18, the level of the liquid bath having previously been established at approximately the line indicated at "a" in Figures 2 and 6. The spinach will then be buoyantly supported on the liquid and, due to the continuous overflow of the liquid at the opposite end, it will gradually pass lengthwise of the washing tank. During the entire travel, however, the volume of liquid, which is normally disposed above the false bottom 21 of the tank 13, will be continuously agitated by the upwardly projecting jets of water which are forced from openings 28 in the submerged agitating pipes 27. This will cause a desired ebullition of the bath and will tend to loosen the extraneous matter associated with the articles being washed. The violence of this ebullition may be accurately controlled by regulation of the valves 31 so that fragile materials may be handled without damage and that others to which extraneous material stubbornly adheres may be violently treated if desired.

As the material passes throughout the length of the washing tank, it will be subjected at intervals to the downwardly projecting action of the jets of water passing from openings 38 in the lateral pipes 36. These jets will impinge against the material and force it downwardly into the turbulent bath in a manner to cause it to turn over and to be "churned" around with a resultant scrubbing action.

When the articles reach the end of the tank adjacent the elevator 39, they will be spread out upon the surface of the liquid, which at this point is not under the influence of agitation by upper or lower jets and is therefore substantially at rest. This is due to the fact that the water with the articles being washed passes over a wier plate 54 adjacent the elevating conveyor 39. At the same time the wash water will be rapidly drawn over this plate into pipe 50 by the pump 34. The result is that the articles are uniformly spread across the washing tank 13 and are uniformly distributed upon the elevating conveyor 39 without being damaged while being properly disposed for the blanching operation. The material, such as spinach, will then be distributed over the surface of the liquid in a predetermined thickness and when it encounters the inclined portion "b" of the endless conveyor 39, it will engage the conveyor and be carried upwardly and through the blanching apparatus, where it will be subjected on upper and lower sides to the blanching action of steam jets, which will tend to not only blanch the material, but loosen the water therefrom and cause it to emerge from the blanching apparatus in a clean and crisp condition.

All of the water which has drained from the material being treated, will then pass through the settling tank and may thereafter be re-delivered to the jets of the washing tank by the action of the pump 34.

It will thus be seen that by the method here disclosed the continuous washing of fruit and vegetables may be carried on by an apparatus which may be adjusted to meet conditions present in connection with the treatment of material of various characters and requiring varying degrees of vigorous treatment, and that said material may be automatically removed from the tank without possibility of crushing or damaging in handling and may thereafter be uniformly subjected to the blanching action of steam as it passes to other and subsequent treating apparatus.

While I have shown the preferred form of my invention as now known to me, it will be understood that various changes might be made in the combination, construction and arrangement of parts by those skilled in the art without departing from the spirit of the invention as claimed.

Having thus described my invention, what I claim and desire to secure by Letters Patent is—

1. In a device of the character described, a washing tank within and through which a bath of water has an end to end flow and upon the surface of which articles are buoyantly supported and conveyed, means within the tank for setting the surface portion of the bath of water in a condition of turbulence by submerged agitation of the bath, and other means disposed at intervals throughout the length of travel of the bath and thereabove for creating counter turbulence from above the surface of the bath.

2. In a device of the character described, a washing tank having a false floor therein, above which the level of a bath of washing liquid is maintained, means substantially at the level of the perforate floor and submerged within the liquid for creating turbulence above the false floor, said floor having openings therethrough at points between the turbulence means for permitting solid particles in the liquid to gravitate through the floor and to be entrapped in the liquid therebeneath.

3. In a device of the character described, a washing tank having a false floor therein, above which the level of a bath of washing liquid is maintained, means substantially at the level of the perforate floor and submerged within the liquid for creating turbulence above the false floor, said floor having openings therethrough at points between the turbulence means for permitting solid particles in the liquid to gravitate through the floor and to be entrapped in the liquid therebeneath, and means arranged transversely of the bath and above the surface thereof for acting upon and violently agitating the liquid at intervals throughout its path of travel.

4. In a device of the character described, a washing tank, means for delivering liquid into one end of said tank, and for permitting it to overflow at the opposite end of the tank whereby a predetermined level of liquid may be maintained within the tank, and an end flow of the liquid will be created, a false perforate floor extending longitudinally of the tank and submerged within the liquid at a desired depth below the surface of the liquid, means extending longitudinally of said floor whereby jets of water will be violently projected upwardly into the body of liquid above the false flooring to create a turbulent condition therein, and a plurality of laterally arranged sets of water jets adapted to project the water downwardly against the surface of the liquid at intervals along its path of travel and whereby increased agitation of the liquid and articles jointly carried thereby will be effected.

5. In a device of the character described, a washing tank, means for delivering liquid into one end of said tank, means for withdrawing liquid from the other end of said tank whereby buoyant articles carried by the liquid will have an end to end travel of the tank, an endless elevating conveyor disposed at the end of the tank to which the articles travel, and a member extending down to the surface of the liquid and under which the buoyant articles must pass as they are carried with the liquid, and by which member the articles are spread over the surface of the liquid in a uniform layer to thereafter pass onto an endless conveyor.

6. In a device of the character described, a washing tank, means for delivering liquid into one end of said tank, means for withdrawing liquid from the other end of said tank whereby buoyant articles carried by the liquid will have an end to end travel of the tank, an endless elevating conveyor disposed at the end of the tank to which the articles travel, and a member extending down to the surface of the liquid and under which the buoyant articles must pass as they are carried with the liquid, and by which member the articles are spread over the surface of the liquid in a uniform layer to thereafter pass onto an endless conveyor, and a pump attached at the end of the tank toward which the liquid flows and by which the liquid may be continuously and positively withdrawn from said tank.

7. A device of the character described comprising a relatively narrow and long washing tank through which a bath of water has an end to end flow and upon the surface of which bath articles may be buoyantly supported and conveyed, means acting beneath the surface of the water and means acting above the surface of the water to agitate the same and to wash the articles buoyantly conveyed therealong, an endless conveyor disposed adjacent the eduction end of the tank and having a run presenting a surface continuously moving upwardly and outwardly from the bath and intercepting the path of travel of the buoyant articles at the surface of the bath, and a member projecting downwardly into the path of travel of the articles in advance of said endless conveyor and adapted to spread the articles out upon the surface of the conveyor whereby they may be delivered in an evenly distributed uniform thickness onto the conveyor and to be thereafter elevated from the bath.

8. A device of the character described comprising a washing tank, means for delivering liquid into the tank and for permitting it to overflow at one end thereof, whereby a predetermined level of liquid will be maintained and the liquid will flow toward said end of the tank, a false floor extending longitudinally of the tank and submerged in the liquid thereof, said floor being formed with openings through which solid matter may settle into the relatively motionless body of liquid beneath the floor, a plurality of water discharge jets occurring along and above the floor and arranged in rows longitudinally of the tank whereby the body of the liquid above the false floor will be agitated, a plurality of water discharge jets arranged in rows extending laterally of the tank and at spaced intervals throughout the length thereof whereby the surface of the body of liquid may be agitated, a weir plate spaced from the discharge end of the tank and having its upper edge submerged beneath the surface of the liquid a distance to permit buoyantly supported articles to float over said edge and into a zone where the liquid is relatively quiet, a downwardly extending baffle member terminating adjacent the surface of the liquid within said quiet zone and whereby the articles buoyantly supported on the liquid will be spread to a uniform thickness as they travel beneath said members, and an endless conveyor within said relatively quiet body of water presenting a continuous surface against which said uniformly spread articles may flow and upon which they will be disposed as elevated upon the rising surface of the said conveyor.

9. In a device of the character described, a tank within which a body of water is maintained and upon the surface of which articles are buoyantly supported as they move lengthwise of the tank, a weir plate disposed adjacent the discharge end of the tank and submerged within the body of water whereby its upper edge will be a predetermined distance below the surface of the water thus tending to spread the articles buoyantly floating on the water and to create a relatively stagnant body of water at one end of the tank, a baffle member having a convexed end terminating adjacent the surface of the water and acting to spread and arrange the buoyantly supported articles at a predetermined depth over the surface of the water, and an endless conveyor against which said articles move and along which they will be continuously spread to the predetermined uniform depth as they are elevated upon the conveyor.

CLARKE J. LANE.